United States Patent [19]

Rosen

[11] Patent Number: 4,899,879
[45] Date of Patent: Feb. 13, 1990

[54] DISPLAY PACKAGE

[76] Inventor: Howard Rosen, 401 W. Superior St., Chicago, Ill. 60610

[21] Appl. No.: 227,186

[22] Filed: Aug. 15, 1988

Related U.S. Application Data

[63] Continuation-in-part of Ser. No. 67,318, Jun. 26, 1987, Pat. No. 4,813,534.

[51] Int. Cl.[4] .............................................. B65D 85/00
[52] U.S. Cl. ................................... 206/445; 206/232; 40/158.1; 40/159
[58] Field of Search .................... 206/232, 445, 446; 40/10 D, 158 R, 159

[56] References Cited

U.S. PATENT DOCUMENTS 3,464,135  9/1969  Eidinger ...................... 206/232 X Primary Examiner—Allen M. Ostrager
Attorney, Agent, or Firm—Martin Faier

[57] ABSTRACT

A display package for holding a folded box for audio-visual material having indicia describing the box contents which consists of a transparent envelope, the envelope comprising sheets of plastic material secured together on their edges, one edge being open to permit the folded box to be inserted into and withdrawn from the envelope, one sheet being rigid for holding the envelope upstanding, thereby being a stop seam at one end of the envelope to hold the folded box positioned away from the envelope edge, and a pocket secured to the envelope on its end opposite the stop seam for holding information related to the category of the audio-visual material. The invention also relates to an indexing system for audio-visual material where a plurality of like such display packages are arranged one behind another in a bin, packed loosely to allow one package to be flipped away from another package for selective browsing through the packages, and to a method for arranging such a system which consists of the steps of removing the materials from their boxes, folding boxes to a flattened condition, inserting each box into such a display package and arranging the packages uprights in a bin for browsing therethrough by a consumer. The display package pocket also includes novel means for holding indicia placed therein from falling from the pocket during flipping and handling of the packages.

16 Claims, 1 Drawing Sheet

DISPLAY PACKAGE

This application is a continuation-in-part of co-pending application Ser. No. 67,318, filed June 26, 1987, for a DISPLAY PACKAGE, now U.S. Pat. No. 4,813,534, granted Mar. 21, 1989.

BACKGROUND AND SUMMARY OF THE INVENTION

This invention relates to display packages for video cassettes and compact discs, useful in indexing and arranging titles and descriptive information available for review and selection by customers in the environment of a video rental and sales store. The invention also relates to a method for efficient organization of displays in such stores.

Video cassettes and compact discs are normally packaged by the manufacturer in oversized boxes, and these boxes have become of substantial value to retail rental and sales storekeepers because the packages contain descriptive information concerning the contents of the cassette or disc, and consumers find these packages essential in making a selection of a video or disc for rental or purchase. These packages are usually oversized to make it difficult for the potential shoplifter to remove the product from the store without being detected. However, the condition of the package has also become important, because the wholesale distributor usually will not accept return of the product without the package clean and in tact; it is also believed that the cassette or disc cannot be sold or rented at the best possible price if the package is damaged, missing or soiled. For these reasons, most video store operators are very protective of the manufacturer's packaging and are concerned with maintaining such packages clean and unsoiled, although the business requires that the packages be available to the public for use in selecting a tape or disc for rental or purchase. It is that dilemma of the storekeepers who want to make these packages available for use by the consumer but retain them in good condition, that this invention speaks and seeks to solve.

Usually, in a typical video store such packages prepared and supplied by the cassette or disc manufacturer (as the outside jacket of his product) are arranged on a shelf or wall display in the store. Where the retailer maintains an inventory of several thousand prerecorded cassette and compact discs, the space problem for the store is magnified by the display requirements. Such a store usually must have several thousand square feet to meet the display space requirements, eventhough the inventory requirement for the store is very small, because the cassettes and discs can be handled in a fraction of the total store space.

These display problems are even more critical in view of variations in the manufacturer's package size and design utilized by different makers. There is considerable competition for display space, and each manufacturer tries to make its display package more enticing to the consumer, and that motive makes it even more difficult for the storekeeper to present an organized and convenient display arrangement. Further, some cassettes are available for Beta video cassette recorders and others use a VHS system, and each maker and system present quirks in the sizing and styling of the display boxes, emphasizing the need for a most versatile display system These problems in maintaining and using conventional display packages for video cassettes and compact discs may be substantially overcome by the display package and method embodying the present invention. For example, a wall display shelving system popular in the video store business utilizing convention display packages and methods requires about 260 square feet, or 32 lineal feet, eight feet tall, to handle about 1,000 video cassette and/or compact disc titles, and evenso, some display packages are too high for examination by short people, women and children, and other display packages are arranged on floor level shelves, making it difficult for some people to reach them. Using the novel display system embodying the present invention, only a small fraction of the store space is needed for display of the same thousand titles, usually about only six square feet, all at counter height convenient for most people to use.

Moreover, applicant's novel display system opens up to the entrepreneur possibilities not available with prior art systems. More titles can be handled in the same space. Space rentals on a per title offered basis are substantially less. Better and more convenient store locations are possible using less square footage. Other opportunities to handle related merchandise become available using applicant's system, for example, businesses such as convenience and drug stores, supermarkets and the like with applicant's system have the opportunity of marketing video cassettes and compact discs, without causing special space problems normally associated with the use of conventional displays.

Applicant's display package consists of a special clear plastic envelope of sufficient dimension to contain most known video cassettes and compact disc display boxes. This novel envelope is constructed so that it is adequately rigid to be arranged upstanding in a display bin, but it is also suitably soft to permit easy entrance in and withdrawal from the envelope of the manufacturer's display package box and other indicia. The envelope also has seals and stops to permit the manufacturer's package box to be somewhat lifted so that the envelop contents can be easily read as the consumer flips through a number of similar envelopes arranged in a series one behind the other in a bin. Preferably, each envelope has suitable pockets for holding a heading having indicia classifying the program contents, as well as other pockets for inventory and similar information. It is desirable for the envelopes and a suitable bin for holding them to be dimensioned so that the bin can also suitably house the envelopes during shipment and then be used by the retailer as a container for housing indexed envelopes for use by customers browsing for their video cassette or compact disc selections.

The display package embodying the present invention is even more versatile if constructed with pockets in a manner to easily accommodate category and inventory information. A novel header pocket for receiving category or similar information is constructed in a manner where, without interfering with the indicia receiving envelope, it can receive the desired data, and will not be dislodged during handling or browsing, by the providing of heat seal tabs reducing the entry width of the pocket compartment. Also, similar tabs are provided for lower pockets intended to contain inventory information, but it is desired that the height of these lower pockets also be relatively short to permit easy installing and withdrawing of an inventory card. Also, by making these pockets and heat seal tabs co-extensive with the display package edge seal seams and the stop seam, less expensive manufacturing procedures can be employed in manufacturing the product, thus providing an efficient display package at an reasonable costs.

OBJECTS AND ADVANTAGES OF THE INVENTION

It is the object of the present invention to provide a novel display package of the character recited for video cassettes and compact discs.

Another object is to provide a display package which consists of an envelope suitably transparent for viewing of a folded box inserted therein and suitably flexible for easy insertion of the box, but suitably rigid to permit like envelopes arranged one behind the other to be indexed upstanding and browsed through by a consumer.

Another object is to provide a series of envelopes containing folded video cassette and compact disc display boxes arranged in bins for indexed browsing and selection by a consumer.

Another object is to provide a novel display envelope of transparent material having seals and stops for displaying a folded box in a selected position.

Another object is to provide novel transparent display envelope having novel pockets for receiving indicia in a header along one edge of such an envelope and other novel pockets for receiving indicia along an opposed end of such an envelope.

Another object is to provide novel heat seal tabs for reducing the entry width of pockets arranged on the envelope of the display packages.

Another object is to provide a carton having arranged therein a series of transparent envelopes stacked one behind another, wherein the carton is suitable for use as a bin for indexed arrangement of such envelopes when filled with folded boxes.

Another object is to provide for a method for efficient organization of video cassette and compact disc titles in a video rental and sales store.

A further object is to provide a display package for video cassette and compact disc containers which is inexpensive and efficient to arrange and use without affecting future use of such containers.

These and other objects and advantages of the invention will become more apparent as this description proceeds, taken in conjunction with the accompanying drawings.

BRIEF DESCRIPTION OF THE DRAWINGS

In the drawings:

FIG. 4 is another cross section view of another modified header arrangement similar to FIG. 2, except with portions broken away.

DESCRIPTION OF PREFERRED EMBODIMENTS

Figure 1:
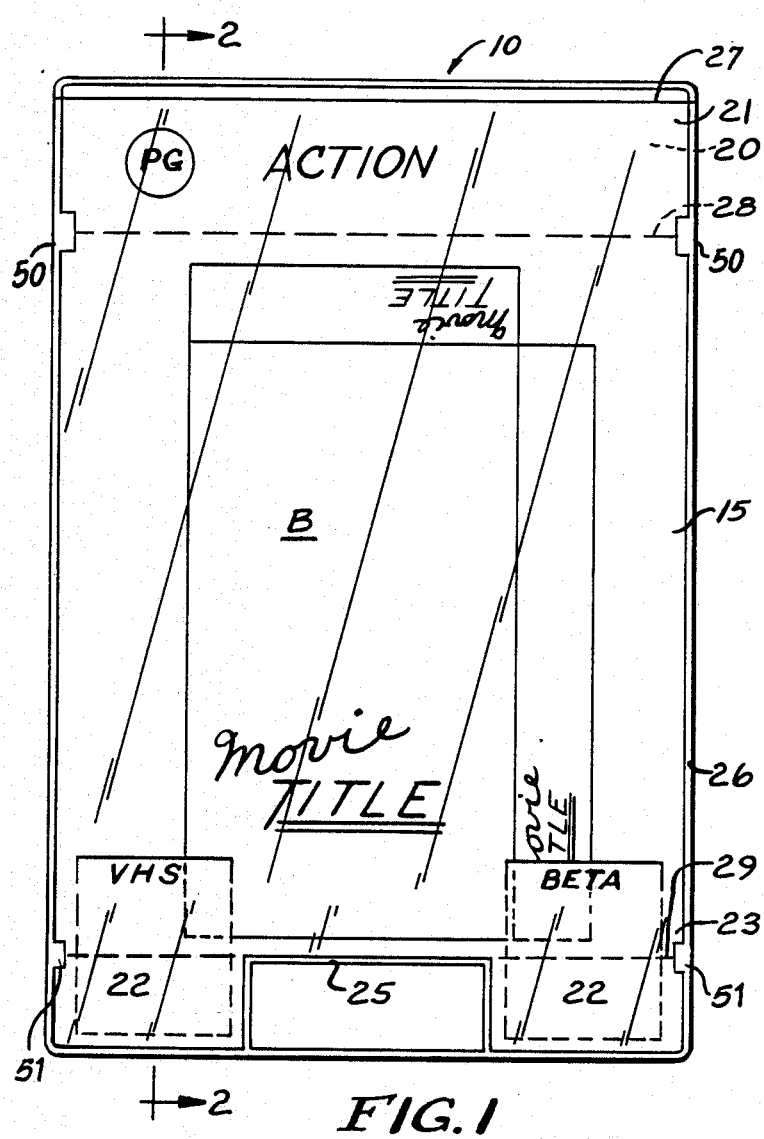
FIG. 1 is a front elevations view of a display package embodying the present invention.
Figures 2, 3:
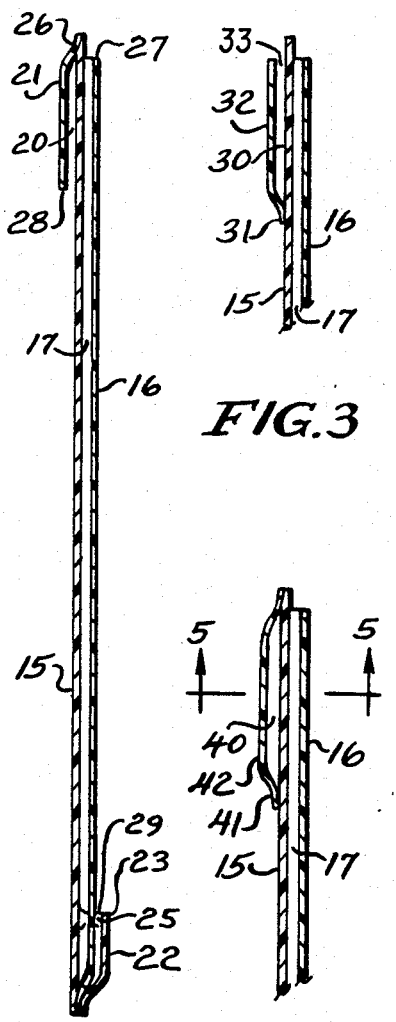
FIG. 2 is a section view of the display package taken on line 2—2 of FIG. 1.
FIG. 3 is a modified header arrangement similar to FIG. 2, except with portions broken away.
Figure 7:
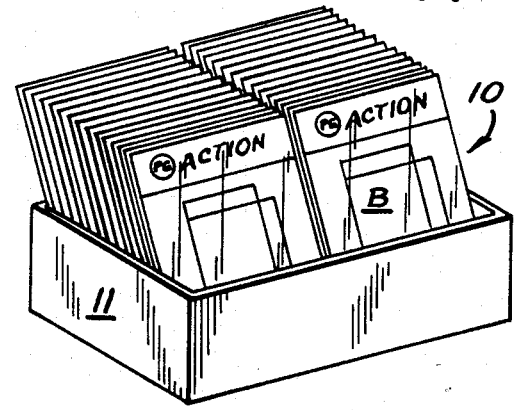
FIG. 7 is a typical perspective view of the envelopes arranged in a bin embodying the present invention.

With reference particularly to FIGS. 1, 2 and 7, an envelope 10 fabricated from transparent material, preferably made from sheets of polyethylene or poly vinyl chloride, is adapted to receive a folded box B of the kind used to house a video cassette or compact disc. Such boxes are usually made from paperboard or similar material and are foldable to a flat condition when the video cassette or compact disc is removed. The outside surfaces of the box usually describes the contents including the title of the work, its case and credits, a synopsis of the store or other work contained on the cassette or disc, and other information which may be helpful in interesting the consumer in the work.

As shown in FIG. 7, a series of like envelopes 10 are arrange one behalf another and side by side in a bin 11. This bin 11 may comprise a corrugated box having a conventional cover (not shown) which may be used by the envelope manufacturer to ship a supply of envelopes to the video stores and then used by the retailer to display envelopes containing the folded boxes B, which are usually arranged so that the envelopes may be indexed, for example by category or alphabetically or otherwise, and flipped for browsing by the consumer when selecting a desired video cassette or compact disc title. Once the desired title is selected, the consumer may inform an attendant of the selection, and the attendant may select the cassette or disc required by the consumer from a secured inventory held by the storekeeper away from access by the consumer.

Preferably, the envelope 10 is fabricated from sheets of predetermined varying rigidity. One of the larger sheets 15 of the envelop is preferably of relatively stiff plastic, and its adjacent coextensive sheet 16 is relatively flexible, so that the pocket 17 formed by the adjacent sheets 15 and 1 for containing the folded box B is flexible, permitting easy entry into the pocket while providing overall rigidity of the envelope to permit it to be arranged in selected indexed position upstanding in the bin 11. The envelope 10 may also have a header pocket 20, formed by a sheet 21 overlaying the larger sheet 15. This header pocket 20 may be used to display indicia such as the category or the cassette or disc.

Lower pockets 22 may also be formed by a lower sheet 23 arranged across the lower portion of the adjacent sheets 15 and 16. Preferably, a stop 25 is provided across the sheets 15, 16 and 23 which acts to prevent the folded box B in pocket 17 from bottoming out in the pocket 17, thus facilitating flipping of the envelopes and presenting the boxes B in a more uniform position, despite limited differences in sizes.

Preferably, the entire periphery of the adjacent sheets 15 and 16, except the upper edge of the sheet 16, the periphery of the sheet 21, except its upper edge, and the periphery of the sheet 23, except its upper edge, are sealed by means of a heat-sealed seam 26, and this seam 26 defines the pockets. The open entry to the pockets 17, 20, and 22 are defined by the unsealed open edges of the sheets 16, 21 and 23, at entries 27, 28 and 29, respectively.

Figure 5:
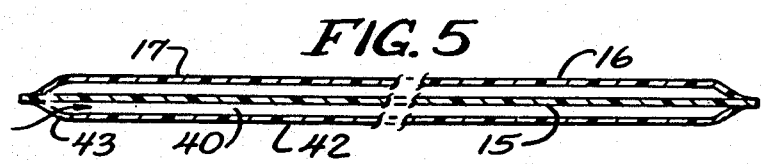
FIG. 5 is a cross-sectional view of the modified header arrangement shown in FIG. 4, taken on line 5—5 of FIG. 4.
Figure 6:
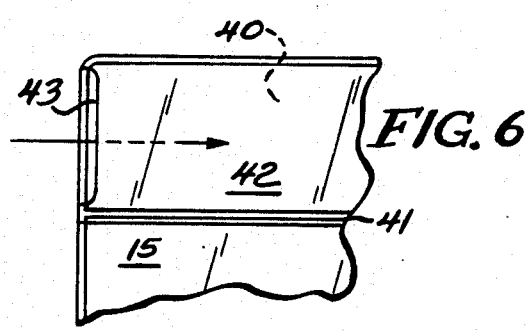
FIG. 6 is a fragmentary front elevational view of the header arrangement shown in FIGS. 4 and 5.

In the embodiment shown in FIG. 3, the header pocket 30 has a heat seam 31 at its bottom edge of the small sheet 32, so that the pocket 30 has its entry at the top edge 33 of the pocket, which is formed by welding or other closure between the sheets 15 and 32. In the embodiment shown in FIGS. 4, 5, and 6, the header pocket 40 has a header sheet 42, which with large sheet 15 forms the pocket, and the heat weld 41 joins the sheets 15 and 42 together, except at the one side edge 43, which is left open for insertion of the header card into the pocket 40. In the FIG. 3 and FIGS. 4-6 embodiments, there is less chance for the header card to slip out of the respective pockets 30 and 40, as compared to pocket 20 in he FIGS. 1-2 embodiment, because the modified pockets 30 and 40 have an opening other than at the bottom of the pocket. However, if the header card intended for insertion into the pocket 20 is cut with great care to a size about the size of that pocket, there is little danger of the header card falling from the pocket, and the additional cost of seaming at heat seal 31 and heat weld 41 in the modified embodiment is not always justified.

With reference particularly to FIGS. 1 and 2, a pair of upper heat seal tabs 50 are provided in upper or header pocket 20 at the point where the sheet 21 is secured to the sheet 15, and a pair of lower heat seal tabs 51 are provided in the lower or inventory card pocket 22 at the point where the sheet 23 is secured to the sheet 16. These tabs 50 and 51 tighten up the respective pockets 20 and 22 sufficiently to hold the contents securely, free from dislodgement during flipping and handling. Further, with respect to the lower pocket 22, preferably it extends only to the height of the stop seal 25, making it easier to install or withdraw the "VHS" or "BETA" card, without fear of losing it during handling. Also, the arrangement of the stop seam 24, edge seam 26, and tab seals 50 and 51 at common locations makes it possible to more efficiently construct the display package at a more economical cost, because a single heat welding operation at those points provides all of the heat welding steps necessary to create the desired compartments.

Preferably, the larger or base sheet 15 is fabricated from about 0.020 gauge clear rigid poly vinyl chloride plastic and the other sheets are fabricated from about 0.006 gauge clear flexible poly vinyl chloride plastic.

While the embodiments of the invention have been described in considerable detail, it is not desired that the invention should be limited to the exact structure described, as the structure can be modified or changed without departing from the scope or spirit or the invention.

I claim:

1. An indexing unit for audio-visual materials comprising:
   a plurality of like display packages each for holding a folded box having indicia thereon,
   each such display package comprising an envelop at least a portion of which is transparent to display such box indicia,
   each said envelop comprising sheets of plastic material secured together on their edges, at least one end of said envelop being open to permit said folded box to be admitted into and withdrawn from said envelop, at least one of said sheets being rigid for holding said envelop upstanding,
   each said envelop having a stop seam spaced apart from one edge of said envelop for holding said folded box away from said edge, and
   a bin for containing said display packages upright arranged one display package behind another display package,
   said bin being of a height less than the height of said display packages to reveal an upper portion of said display packages in said bin,
   said display packages being removably seated in said bin and packed loosely in said bin to allow one such package to be flipped away from another of said packages for selective browsing through said plurality of packages.

2. In the indexing system recited in claim 1, wherein said display packages are also arranged side by side in said bin.

3. In the indexing system recited in claim 1, wherein each of said display packages has a pocket viewable from the exterior of said envelope secured to said envelope on an end thereof.

4. In the indexing system recited in claim 3, wherein each of said display packages has a stop seam spaced apart from and at one end of said envelope remote from said pocket adapted to hold said folded box positioned away from the end of an envelope in said bin.

5. In a method for arranging an indexing system for a plurality of audio-visual materials each packed in foldable boxes bearing indicia describing their contents, said method comprising the following steps:
   removing such materials from such foldable boxes,
   folding such boxes to a flattened condition,
   inserting each such folded box one into a series of like plastic envelopes, at least a portion of which is transparent to display the descriptive indicia on said folded box, each of said envelopes being sufficiently rigid to hold its folded box upright, each such envelope having a stop seam spaced apart from one of its edges for spacing said folded box away from said envelope edge,
   positioning and arranging said envelopes loosely one behind another upright in said bin to allow one such envelope to be flipped away from another of said envelopes for selective browsing through a plurality of envelopes.

6. In the method recited in claim 5, with the additional step of providing a pocket at one end of said envelope and inserting in said pocket indicia describing the category of such audio-visual material.

7. In the method recited in claim 5, with the additional step of positioning said envelope loosely in said bin to allow one such envelope to be flipped away from another of said envelopes for selective browsing through a plurality of envelopes.

8. In the method recited in claim 5, with the additional step of arranging a plurality of such envelopes containing such flattened boxes side by side with such envelopes arranged one behind another.

9. A display package for holding indicia therein, said display package comprising:
   an envelop, at least a portion of which is transparent to display said indicia when placed therein,
   said envelop comprising a rigid sheet and a flexible sheet coextensive with said rigid sheet,
   said sheets being secured together and sealed at their edges except at one edge where said envelope is open to permit said indicia to be admitted into and withdrawn from said envelop,
   a stop seam through said sheets welding said sheets together,
   said stop seam being arranged at an end of said envelop opposed to said open edge,
   said stop seam being adapted to hold said indicia positioned away from said coextensive sealed sheet edge remote from said open edge, and
   a pocket viewable from the exterior of said display package secured to one of said sheets, said pocket having an edge secured to said envelope corresponding and common to at least one of said sealed sheet edges, said pocket being adapted to receive media other than said indicia, said pocket having a heat seal tab adjacent and joining it to one of said sealed sheet edges.

10. The display package recited in claim 9, wherein said pocket is positioned at an end of said envelope adjacent said open edge.

11. The display package recited in claim 9, wherein said pocket is of lesser width at the location of said heat seal tab than it is apart from said heat seal tab.

12. The display package recited in claim 9, wherein said pocket is positioned near an end of said envelope remote from said open edge and adjacent to said stop seam.

13. The display package recited in claim 12, wherein said stop seam defines a wall of said pocket.

14. The display package recited in claim 12, wherein said pocket extends above said remote end substantially the same distance as said stop seam extends from said remote end.

15. The display package recited in claim 9, wherein said heat seal tab and sealed sheet edges are common to said rigid and flexible sheets and said pocket.

16. The display package recited in claim 15, wherein said pocket is positioned near an end of said envelope remote from said open edge, and said stop seam extends through said pocket.

* * * * *